(12) United States Patent
Weber et al.

(10) Patent No.: US 8,982,157 B2
(45) Date of Patent: Mar. 17, 2015

(54) COLLISION FREE CONSTRUCTION OF ANIMATED FEATHERS

(75) Inventors: Andrew J. Weber, Glendale, CA (US); Galen Gerald Gornowicz, Sierra Madre, CA (US)

(73) Assignee: DreamWorks Animation LLC, Glendale, CA (US)

( * ) Notice: Subject to any disclaimer, the term of this patent is extended or adjusted under 35 U.S.C. 154(b) by 964 days.

(21) Appl. No.: 12/844,822

(22) Filed: Jul. 27, 2010

(65) Prior Publication Data

US 2012/0026172 A1 Feb. 2, 2012

(51) Int. Cl.
| | |
|---|---|
| G09G 5/00 | (2006.01) |
| G06T 13/00 | (2011.01) |
| G06T 13/40 | (2011.01) |
| G06T 17/20 | (2006.01) |

(52) U.S. Cl.
CPC ............... *G06T 13/40* (2013.01); *G06T 17/20* (2013.01)
USPC .......................................... 345/647; 345/473

(58) Field of Classification Search
USPC ................................................. 345/647, 473
See application file for complete search history.

(56) References Cited

U.S. PATENT DOCUMENTS

| | | | |
|---|---|---|---|
| 6,204,860 B1 | 3/2001 | Singh | |
| 6,559,849 B1 | 5/2003 | Anderson et al. | |
| 6,720,962 B1 | 4/2004 | Alter | |
| 6,952,218 B1 | 10/2005 | Bruderlin | |
| 7,050,062 B2 | 5/2006 | Bruderlin | |
| 7,088,374 B2 | 8/2006 | David et al. | |
| 7,098,911 B2 | 8/2006 | Chen et al. | |
| 7,173,622 B1 | 2/2007 | McLaughlin | |
| 7,348,973 B1 | 3/2008 | Gibbs et al. | |
| 7,355,600 B2 | 4/2008 | Baraff et al. | |
| 7,427,991 B2 | 9/2008 | Bruderlin et al. | |
| 7,664,325 B2 | 2/2010 | Lin et al. | |
| 2003/0179203 A1* | 9/2003 | Bruderlin et al. | 345/473 |
| 2004/0030741 A1 | 2/2004 | Wolton et al. | |
| 2005/0212800 A1 | 9/2005 | Petrovic et al. | |
| 2006/0158453 A1 | 7/2006 | Bruderlin et al. | |
| 2007/0270092 A1* | 11/2007 | Gornowicz et al. | 452/127 |
| 2008/0266292 A1 | 10/2008 | Gornowicz et al. | |
| 2008/0266308 A1 | 10/2008 | Gornowicz et al. | |
| 2011/0018875 A1* | 1/2011 | Arahari et al. | 345/420 |
| 2011/0074766 A1* | 3/2011 | Page et al. | 345/419 |

OTHER PUBLICATIONS

Weber. Andrew et al. Collision-Free Construction of Animated Feathers Using Implicit Constraint Surfaces. Apr. 2009. ACM Transactions on Graphics vol. 28 Issue 2, Article No. 12.*

(Continued)

*Primary Examiner* — Devona Faulk
*Assistant Examiner* — Wynton S Jones
(74) *Attorney, Agent, or Firm* — Morrison & Foerster LLP

(57) ABSTRACT

To generate a skin-attached element on a skin surface of an animated character, a region of the skin surface within a predetermined distance from a skin-attached element root position is deformed to form a lofted skin according to one of a plurality of constraint surfaces, where each of the plurality of constraint surfaces does not intersect with each other. A sublamina mesh surface constrained to the lofted skin is created. A two-dimensional version of the skin-attached element is projected onto the sublamina mesh surface. The lofted skin is reverted back to a state of the skin surface prior to the deformation of the region of the skin surface.

22 Claims, 16 Drawing Sheets

(56) References Cited

OTHER PUBLICATIONS

International Search Report and Written Opinion received for PCT Patent Application No. PCT/US07/09650, mailed on Feb. 7, 2008, 11 pages.
Anjyo et al., "A Simple Method for Extracting the Natural Beauty of Hair", Proceedings of SIGGRAPH 1992, pp. 111-120.
Fletcher, R., "Conjugate Direction Methods", Chapter 4 In Practical Methods of Optimization, John Wiley & Sons, 1987, pp. 80-94.
Foley et al., "Animation", Chapter 21 In Computer Graphics: Principles and Practice, 2nd ed., Addison-Wesley Publishing Company, 1990, pp. 1057-1081.
Marsden et al., "Path Independence", Chapter 18.2 In Calculus III, 2nd ed., Springer-Verlag, 1985, pp. 895-901.
Press et al., "Linear Programming and the Simplex", Chapter 10.8 In Numerical Recipes in C: The Art of Scientific Computing, Cambridge University Press, 1988, pp. 329-343.
Riley et al., "Introduction to Mechanics of Materials", John Wiley & Sons, 1989, pp. 62-64, 346-379. 453.
Wu et al., "Realistic modeling of bird flight animations", ACM Transactions on Graphics (TOG), vol. 22, Issue 3, Jul. 2003, pp. 888-895.
Non Final Office Action received for U.S. Appl. No. 11/796,650, mailed on Mar. 30, 2010, 20 pages.
Non Final Office Action received for U.S. Appl. No. 11/796,431, mailed on Jul. 22, 2010, 20 pages.
Notice of Allowance received for U.S. Appl. No. 11/796,650, mailed Nov. 1, 2010, 14 pages.
Notice of Allowance received for U.S. Appl. No. 11/796,431, mailed on Mar. 30, 2011, 8 pages.
Bishop, Richard L., "There is More than One Way to Frame a Curve," American Mathematical Monthly, vol. 82, No. 3. Mar. 1975, pp. 246-251.
Parke, Frederick I., "Computer Generated Animation of Faces," Proceedings of the ACM Annual Conference, 1972, pp. 451-457.
Kim et al., "Interactive Multiresolution Hair Modeling and Editing," ACM Transactions on Graphics, vol. 21, No. 3, Jul. 2002, pp. 620-629.
Hanson et al., "Parallel Transport Approach to Curve Framing", Department of Computer Science, Indiana University, Jan. 11, 1995, pp. 1-20.
Non Final Office Action received for U.S. Appl. No. 11/796,431, mailed on Nov. 12, 2010, 15 pages.
Aitken et al., "The Lord of the Rings: the visual effects that brought middle earth to the screen", Course 10, ACM SIGGRAPH, 2004, 33 pages.
Chen et al., "Modeling and Rendering of Realistic Feathers", Proceedings of the 29th Annual Conference on Computer Graphics and Interactive Techniques (SIGGRAPH), Jul. 2002, pp. 630-636.
Cohen et al., "Simplification Envelopes", Proceedings of the 23rd Annual Conference on Computer Graphics and Interactive Techniques (SIGGRAPH), 1996, pp. 119-128.
Cook, Robert L., "Shade Trees", ACM SIGGRAPH Computer Graphics, vol. 18, No. 3, Jul. 1984, pp. 223-231.
Desbrun et al., "Intrinsic Parameterizations of Surface Meshes", European Association for Computer Graphics (EUROGRAPHICS), vol. 21, No. 2, 2002, 10 pages.
Dong et al., "Surface reconstruction by offset surface filtering", Journal of Zhejiang University Science, vol. 6A (Suppl. 1), 2005, pp. 137-143.
Fletcher, R., "Practical methods of optimization; (2nd ed.)", Wiley-Interscience, New York, 1987, 11 pages.
Fordham, Joe, "Something wicked this way comes", Cinefx, Oct. 1999, pp. 43-64.
Franco et al., "Modeling the Structure of Feathers", Proceedings of the 14th Brazilian Symposium on Computer Graphics and Image Processing (SIBGRAPI'01), 2001, p. 381.
Hadap et al., "Strands and Hair: Modeling, Animation, and Rendering", Course 33, ACM SIGGRAPH Course Notes, May 2, 2007, pp. 1-150.
Kajiya et al., "Rendering fur with three dimensional textures", ACM SIGGRAPH Computer Graphics, vol. 23, No. 3, Jul. 1989, pp. 271-280.
Kaufman, Debra, "Stuart Little 2: Let the feathers fly", Course 32, ACM SIGGRAPH Course Notes, 2002, 121 pages.
Neyret, Fabrice, "Modeling, Animating, and Rendering Complex Scenes Using Volumetric Textures", IEEE Transactions on Visualization and Computer Graphics, vol. 4, No. 1, Jan. 1998, 15 pages.
"The Encyclopedia of Birds", edited by Perrins et al., Checkmark Books, 1985, 4 pages.
Porumbescu et al., "Shell Maps", ACM Special Interest Group on Computer Graphics and Interactive Techniques (SIGGRAPH), vol. 24, No. 3, 2005, pp. 626-633.
Robertson et al., "The big and the smeagol", Computer Graphics World, vol. 27, No. 1, Jan. 2004, 13 pages.
Sederberg et al., "Free-form deformation of solid geometric models", ACM SIGGRAPH Computer Graphics, vol. 20, No. 4 Aug. 1986, pp. 151-160.
Streit et al., "A Biologically-Parameterized Feather Model", European Association for Computer Graphics (EUROGRAPHICS), vol. 21, No. 3, 2002, pp. 565-573.
Tong et al., "Discrete Multiscale Vector Field Decomposition", ACM Transactions in Graphics, vol. 22, No. 3, Jul. 2003, pp. 445-452.
Turk, Greg, "Re-Tiling Polygonal Surfaces", ACM SIGGRAPH Computer Graphics, vol. 26, No. 2, Jul. 1992, pp. 55-64.
Von Funck et al., "Vector field based shape deformations", ACM Transactions on Graphics, vol. 25, No. 3, Jul. 2006, pp. 1118-1125.
Wang et al., "Edge subdivision schemes and the construction of smooth vector fields", ACM Transactions on Graphics, vol. 25, No. 3, 2006, pp. 1041-1048.
Wang et al., "Generalized Displacement Maps", Eurographics Symposium on Rendering, 2004, 8 pages.

* cited by examiner

COLLISION FREE CONSTRUCTION OF ANIMATED FEATHERS

BACKGROUND

1. Field

This application relates generally to computer graphics, and more specifically to computer systems and processes for the animation of feathers.

2. Related Art

Media productions have employed increasingly complex animations in order to construct increasingly realistic images. In addition to animating surfaces, increasing attention has been directed towards skin-attached elements, such as feathers, hair, and fur.

Animating feathers, in particular, has been a challenging subject since the early days of animation. Birds of early animation films were often secondary characters with relatively few, unrealistic feathers. Although more life-like effects have been achieved in modern animation, challenges remain, especially for animating birds with a large number of feathers throughout an animation sequence. For example, when using conventional animation techniques, individual feathers are likely to intersect with one another or with the skin surface such that the animation appears unrealistic. In addition to these intersections (also known as interpenetrations or collisions), the layering of the feathers may be inconsistent when the frames are independently developed for an animation sequence, causing feathers to "pop" from frame to frame.

A number of solutions have been tried. For example, one method sets the feathers at fixed angles with sufficient spacing between feathers to avoid interpenetrations, but the result may appear unnatural. Another approach calculates reference offsets for every control point of a feather and maintains these offsets throughout the animation sequence. While this method makes interpenetrations less likely, it does not eliminate them. One common approach is to process a bird's feathers from tail to head, deforming each feather such that it does not intersect previously positioned feathers. This approach does solve the interpenetration problem, but is susceptible to frame coherency problems (popping) and volume inflation problems (puffing). By making the coloring of the feathers uniform, a certain degree of feather interpenetration can be made tolerable (i.e., minimally visible), at the expense of constraining artistic expression for the animated character. None of these techniques produce particularly realistic animated sequences of feathers, and furthermore, manual intervention may have to be introduced to correct for the defects of an automated approach to animation.

Thus, there is a need for improved animation of feathers and related skin-attached elements.

SUMMARY

In one exemplary embodiment, to generate a skin-attached element on a skin surface of an animated character, a region of the skin surface within a predetermined distance from a skin-attached element root position is deformed to form a lofted skin according to one of a plurality of constraint surfaces, where each of the plurality of constraint surfaces does not intersect with each other. A sublamina mesh surface constrained to the lofted skin is created. A two-dimensional version of the skin-attached element is projected onto the sublamina mesh surface. The lofted skin is reverted back to a state of the skin surface prior to the deformation of the region of the skin surface.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Disclosed in the present application are processes of constructing skin-attached elements applicable for animation. These processes are particularly applicable to constructing complex feather geometry suitable for animating a bird covered with feathers in animation films. Thus, in exemplary processes are described below in the context of generating feathers for an animated character, such as a bird. It should be recognized, however, that these exemplary processes can be applied to various types of skin-attached elements, such as scales, hair, fur, and the like, and various types of computer-generated characters as well (e.g., characters other than birds).

The construction of feathers suitable for feature animation is generally referred to as "lamination." In order for the feather geometry to appear realistic, the feathers outputted by lamination should not interpenetrate, i.e., they should not intersect or collide with one another or with the skin or body of the animated character. In one embodiment provided herein, each feather is constructed to lie on a surface that does not intersect with surfaces corresponding to other feathers, thereby avoiding interpenetration of feathers. Each of these non-intersecting surfaces is referred to here as a constraint surface.

Broadly speaking, and in one example, a process for constructing feathers includes defining an implicit surface that is associated with a unique potential field value anchored to the skin of a character. The implicit surface is referred to as a constraint surface, which comprises an implicit function defined as a displacement from the skin surface of the character, and is by construction non-intersecting with other constraint surfaces. For example, a constraint surface may be described as an implicit displacement map derived from feather directions as described by Cook, R. L., "Shade trees," SIGGRAPH Computer Graphics 18, 3, 223-231 (1984). Constraint surfaces are also described by Weber, Andrew J., "Collision free construction of animated feathers using implicit constraint surfaces," ACM Transactions on Graphics, Vol. 28, issue 2 (April 2009), which is incorporated herein by reference.

Figure 1:
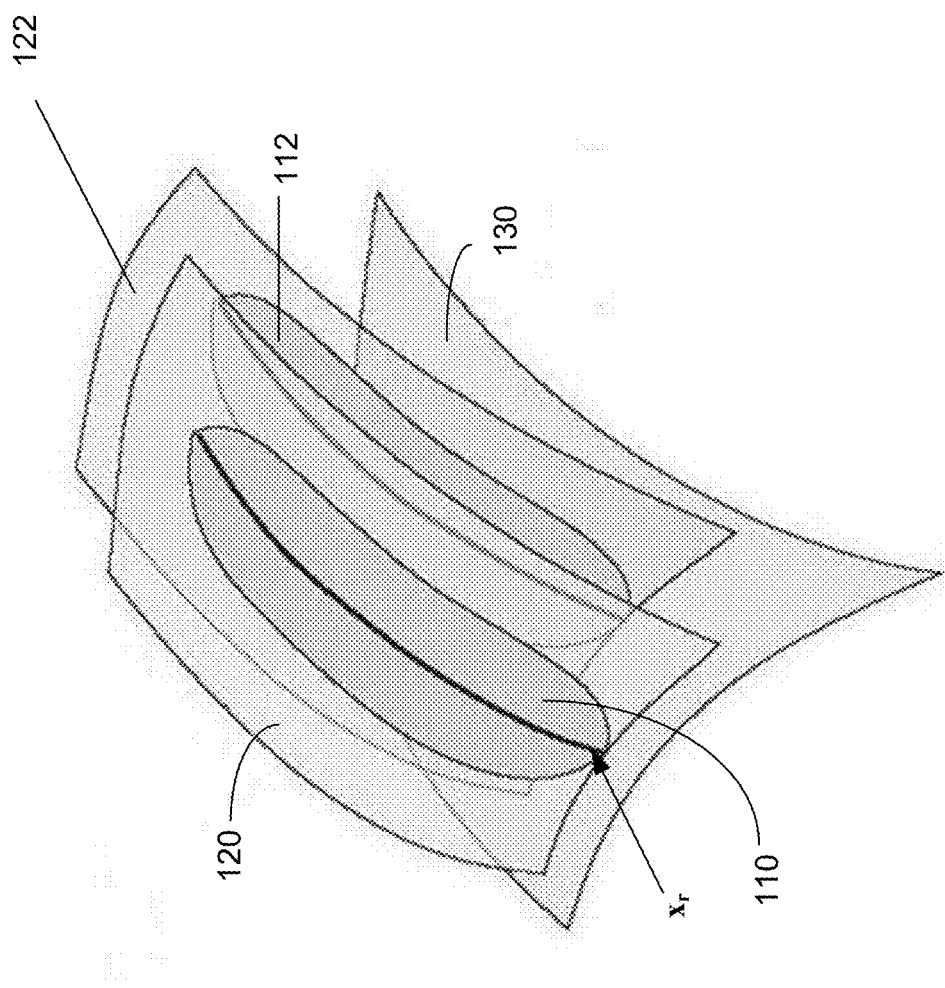
FIG. 1 illustrates two feathers lying on respective constraint surfaces that do not intersect with each other.
Figure 2:
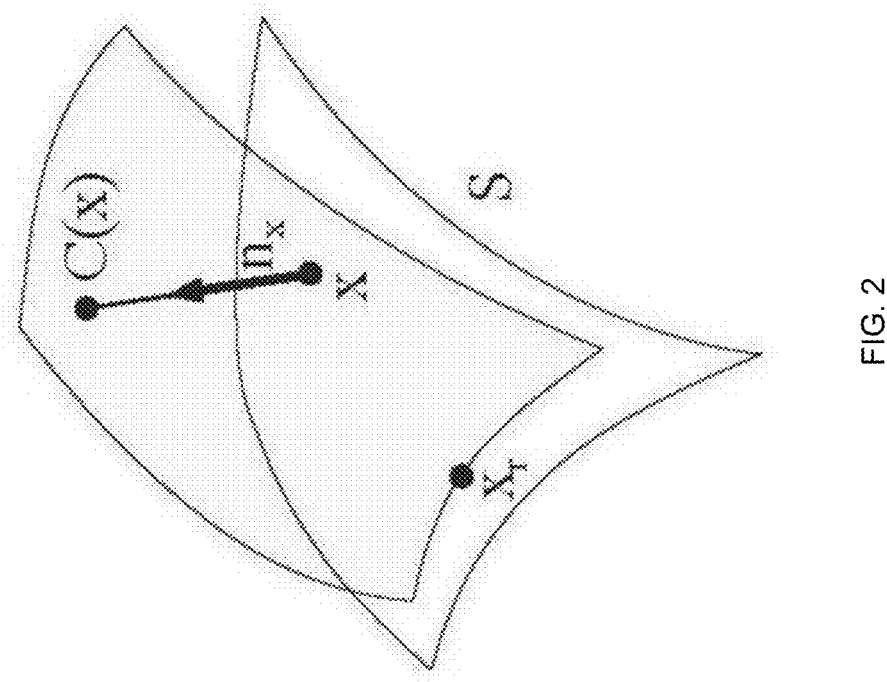
FIG. 2 illustrates a constraint surface intersecting a skin surface at a feather root position.

As an illustration example, FIG. 1 illustrates two feathers 110 and 112 lying on respective constraint surfaces 120 and 122. As described above, each of the constraint surfaces is generated or defined in a manner so as to not intersect, and separate away from the skin surface 130 in the direction of the feathers 120 and 122. Since feathers 110 and 112 each lie on a non-intersecting constraint surface, the feathers do not intersect as well FIG. 2 illustrates a constraint surface C intersecting a skin surface S at a feather root position $x_r$. The constraint surface C may be expressed as a function of x, where x is a point lying on the skin surface S:

$$C(x) = x + M(\Phi(x) - \Phi(x_r))n_x. \quad (1)$$

In equation (1), $n_x$ is the surface normal at position x, $\Phi(x)$ is a scalar potential field defined over S, and $M(\Phi)$ is a scalar mapping function of scalar potential $\Phi$, referred to as the loft function. Equation (1) establishes that for each point x on the skin surface S, there is a corresponding point $C(x)$ on the constraint surface C, and $C(x)$ is displaced from the skin surface in the direction of the surface normal at x. The magnitude of the displacement from the skin surface is equal to the difference between the scalar potential at x and the scalar potential at $x_r$, scaled by the loft function M.

Figure 3:
FIG. 3 illustrates the feathers on a bird's wing generated with a linear loft function.
Figure 4:
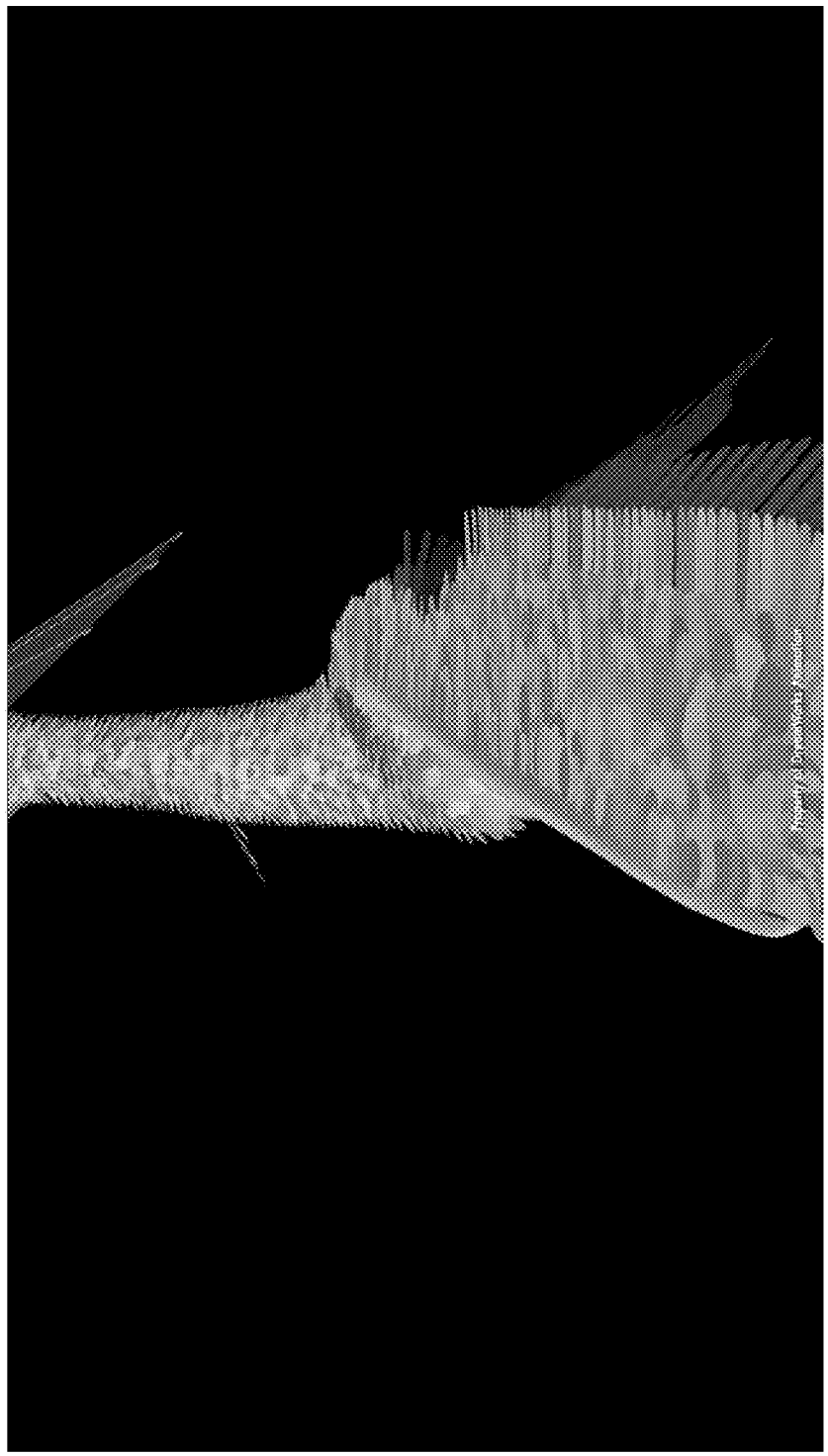
FIGS. 4-5 illustrate the feathers on a bird's wing generated with non-linear loft functions.
Figure 5:
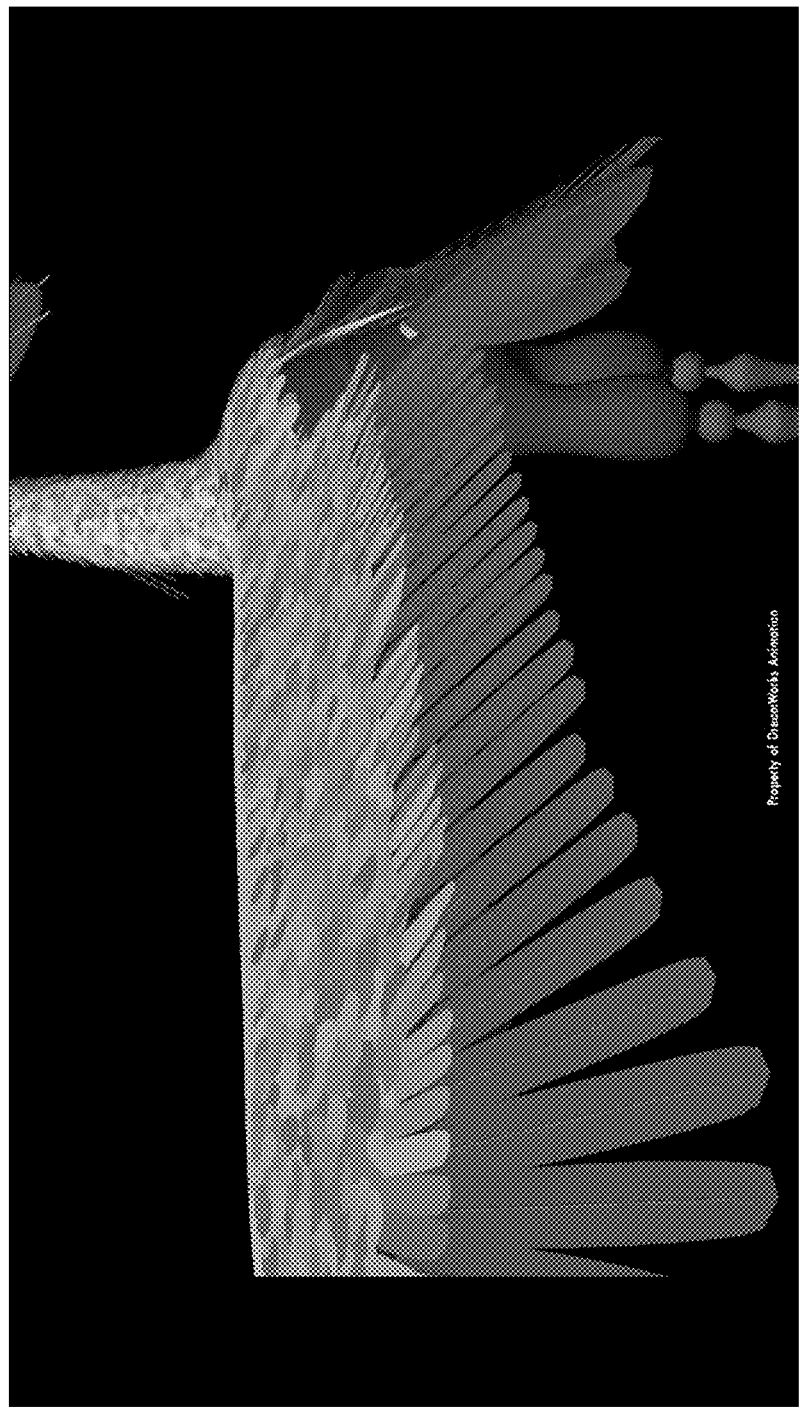

In one example, the loft function M is a monotonically increasing function that defines the curvature of the feather surface relative to the skin surface S. Using different functions as the loft function M produces variations in the way the feathers look. For example, the loft function can be used to inject or remove volume (i.e., fluff up the feathers or lay them down flat) or to remove flares, tips, and the like. In one exemplary embodiment, M is a linear function, and the feathers on a bird's wing appear to be orderly and tidy, as shown in FIG. 3. FIGS. 4 and 5 illustrate feathers on a bird's wing with other choices of loft functions: the feathers appear to be fluffy in FIG. 4, while the feathers in FIG. 5 appear to be loosely packed. It should be recognized that the loft function M may be any monotonically increasing function. Those of ordinary skill in the art will be able to select an appropriate function to create the desired visual effects.

The scalar potential field $\Phi(x)$ is defined over the entire skin surface S of the character, and can be derived based on its relationship to the vector field u of feather shaft directions. The feather shaft directions are user-specified, either manually or by an automated process. For the animation of the feathers to be realistic, the displacement of the feather from the skin generally increases as one moves away from the root of the feather along the direction of the feather shaft. This can be modeled by having the distance between the constraint surface and skin surface, normal to the skin surface, increase in the direction of the irrotational vector field defined by the gradient of the scalar potential field, $\nabla\Phi$.

In general, however, the vector field of feather shaft directions u will not be purely the gradient of the scalar potential field $\nabla\Phi$, but will have an additional rotational component $\nabla\times\phi$:

$$u = \nabla\Phi + \nabla\times\phi. \quad (2)$$

Because of this additional $\nabla\times\phi$ component, the direction of $\nabla\Phi$ may not align adequately with the direction of the vector field u to yield the desired visual effect.

Therefore, an additional degree of freedom is needed in order to minimize the rotational component $\nabla\times\phi$. This degree of freedom arises from the observation that it is the direction of the vector field u at each point x that is relevant for determining the orientation of the feathers, and the magnitude of the vector at each point x can be considered a free variable. Accordingly, the vector field u can be expressed as:

$$u(x) = \alpha(x)\hat{u}(x), \quad (3)$$

where $\hat{u}(x)$ is the directional component of $u(x)$ with unit magnitude and $\alpha(x)$ is the magnitude component.

Thus, given the vector field of feather directions u, the scalar potential field $\Phi$ and the magnitude component a may be chosen to minimize the difference (in the least squares sense) between the normalized vector field $\hat{u}$ and a scaled version of the gradient of the potential field, $\nabla\Phi/\alpha$, over the surface S:

$$\min_{\alpha,\Phi} \int_S \left\|\left(\frac{\nabla\Phi}{\alpha} - \hat{u}\right)\right\|^2 dx. \quad (4)$$

With the potential field $\Phi$ and the loft function M specified, the constraint surface for each individual feather may be constructed by specifying its corresponding, unique root position $x_r$ in equation (1). Further, the construction of the constraint surfaces also satisfies the following conditions:

Condition (i): The scalar potential field $\Phi(x)$ evaluates to unique values for all root positions;
Condition (ii): The constraint surface of a feather intersects the skin surface at the feather's root position; and
Condition (iii): The loft function evaluates to zero for a zero input.

By satisfying the above conditions, it can be shown that the constraint surfaces for the individual feathers do not interpenetrate via the following proof by contradiction. Suppose two constraint surfaces $C_1$ and $C_2$ with corresponding root positions $x_{r1}$ and $x_{r2}$ intersect. If they intersect, they must do so at the same position x:

$$C_1(x) = C_2(x). \quad (5)$$

Applying equation (1) to equation (5), the following equality must hold:

$$M(\Phi(x)-\Phi(x_{r1}))=M(\Phi(x)-\Phi(x_{r2})). \quad (6)$$

Equation (6) will hold if $\Phi(x_{r1})=\Phi(x_2)$. However, by construction, the scalar potential field $\Phi(x)$ evaluates to unique values for all root positions (condition (ii)). Therefore, $\Phi(x_{r1}) \neq \Phi(x_{r2})$. If $\Phi(x_{r1}) < \Phi(x_{r2})$, then by the monotonicity of function M:

$$M(\Phi(x)-\Phi(x_{r1}))>M(\Phi(x)-(x_{r2})). \quad (7)$$

Similarly, if $\Phi(x_{r1}) > \Phi(x_{r2})$, then by the monotonicity of function M:

$$M(\Phi(x)-\Phi(x_{r1}))<M(\Phi(x)-\Phi(x_{r2})). \quad (8)$$

Therefore, equation (6) cannot hold, contradicting the supposition that two constraint surfaces $C_1$ and $C_2$ with corresponding root positions $x_{r1}$ and $x_{r2}$ can intersect. Thus, constraint surfaces constructed using equation (1) and satisfying the aforementioned conditions will not interpenetrate.

Lamination is typically performed within the framework of a more complex system known as an animation pipeline system. An animation pipeline system includes many components (lamination included) working in concert to produce the frames of an animated motion picture. One exemplary animation pipeline system is described in U.S. Patent Application Publication No. 2008/0266292 A1, Decorating Computer Generated Character with Surface-Attached Features, herein incorporated by reference in its entirety for all purposes.

Lamination takes several inputs from the animation pipeline system. One input to the lamination process is the skin surface of the animated character. For example, the skin surface may be defined by polygonal mesh surfaces, parametric surfaces, non-uniform rational basis spline (NURBS), and the like.

The animation pipeline system also provides the shape and direction of each skin-attached element, e.g., a feather. The feather shape can be specified by a template; one suitable template is a model of a flat surface with a boundary. Variations in the shapes of the feathers over the skin surface of the character can be achieved by using multiple templates and random alterations of the templates. The direction of orientation of a feather may be given by the feather shaft direction at its root position on the skin surface. Typically, a small number of guides (tens or hundreds) with the feather directional information may be specified, either manually or through an automated procedure, over the skin surface of the character. The guides may move and deform with the skin surface as the character is animated. From these guides, the directional information for thousands of feathers can be interpolated.

Another input to the lamination process is the root positions of the feathers on the skin surface. The root positions may be generated using any distributed point on surface generation scheme (e.g., see G. Turk, "Re-tiling polygonal surfaces," *Proceedings of ACM SIGGRAPH* 1992, vol. 26, pp. 55-64). However, it should be recognized that other generation schemes may be used as well.

With these inputs from the animation pipeline system, a lamination process in accordance to the present application can be used to construct a set of non-interpenetrating feathers, which may be rendered at a later stage in the animation pipeline.

Figure 6:
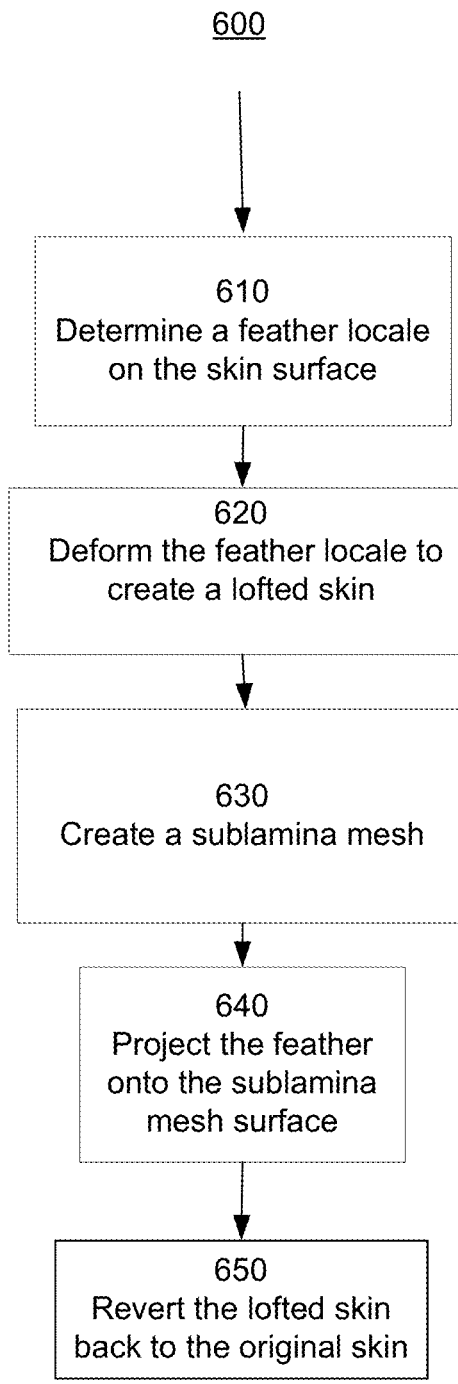
FIG. 6 illustrates an exemplary lamination process for generating a feather.

FIG. 6 illustrates an exemplary lamination process for generating a feather. At step 610, to generate a feather with a feather root position $x_r$ on a skin surface, a local region of the skin surface within a predetermined distance (e.g., any value greater than zero) from the feather root position $x_r$ is first determined. This local region of skin surface is referred to as the feather locale.

It should be recognized that the predetermined distance may be different for different directions. For example, the feather locale may be a portion of the skin surface that is within a distance d1 from the feather root position $x_r$ in one direction, and within a distance d2 from the feather root position $x_r$ in a second direction. In one exemplary embodiment, the distance d1 may be a function of the feather length, while the distance d2 may be a function of the feather width. For example, d1 and d2 may be chosen to exceed the feather length and the feather width, respectively, by a predetermined margin. In another exemplary embodiment, d1 and d2 may be pre-computed constants.

Figure 7:
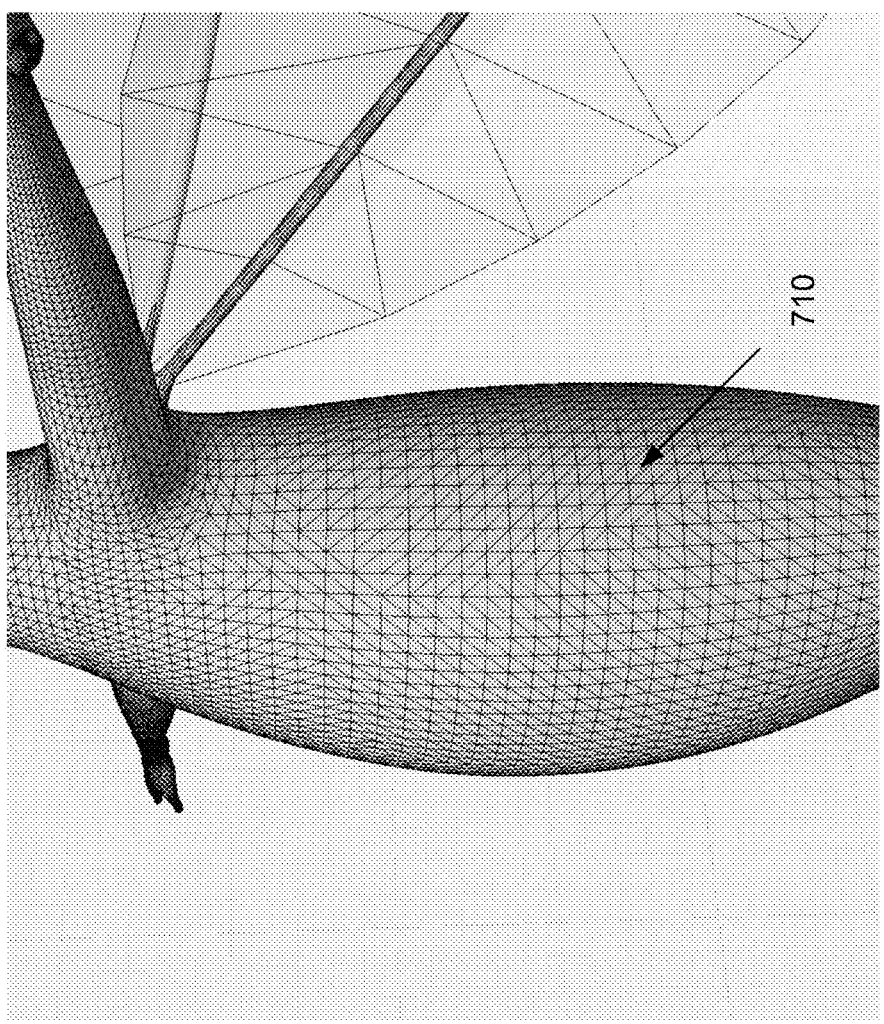
FIG. 7 illustrates a skin surface defined by polygonal mesh surfaces.

In one exemplary embodiment, the skin surface is defined by polygonal mesh surfaces 710 as shown in FIG. 7. As the polygonal mesh surfaces are a collection of vertices, edges, and faces defining the skin surface, the feather locale may be defined by all the vertices that are within a distance d1 from the feather root position $x_r$ in one direction, and within a distance d2 from the feather root position $x_r$ in a second direction. Distances d1 and d2 are each a distance measured along the curved skin surface, rather than a Euclidean distance. Accordingly, the vertices may be efficiently located by utilizing a geodesic library, which includes routines for finding the shortest paths between points on a given surface.

Figure 8:
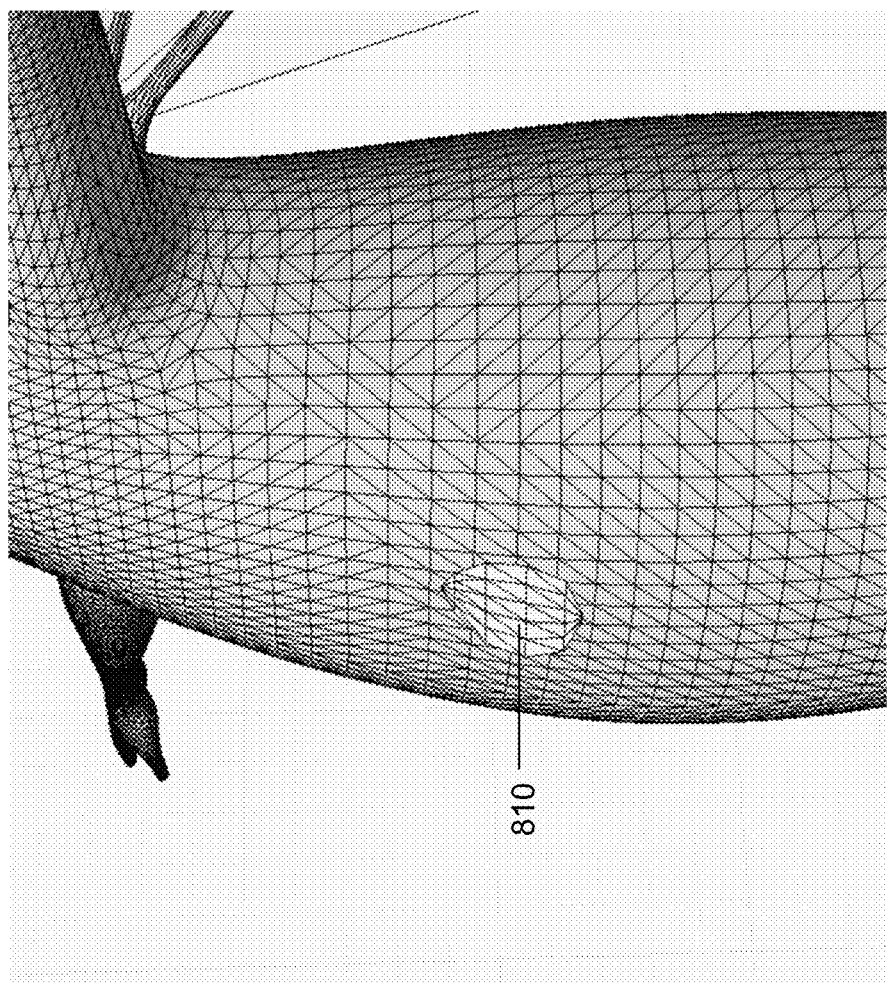
FIG. 8 illustrates the intended shape, direction, and feather root position of a feather to be generated by the lamination process.

As described above, the animation pipeline generates the feather shape and direction and this information is received as input by the lamination process. In FIG. 8, a feather 810 is placed onto the skin surface to illustrate the intended shape, direction, and feather root position of the feather to be generated by the lamination process.

Figure 9:
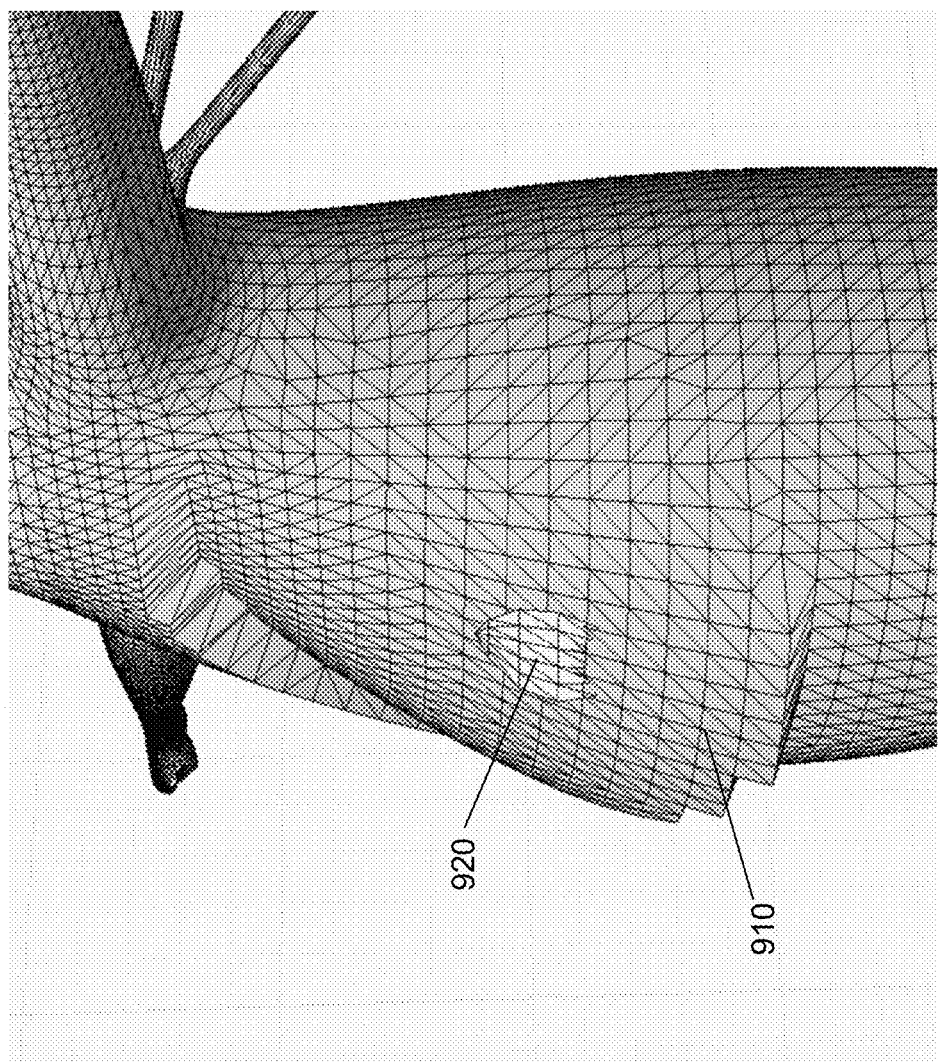
FIG. 9 illustrates a lofted skin above the skin surface shown in FIG. 7.

At step 620 of FIG. 6, the feather locale determined at step 610 is deformed such that the feather locale is lying on top of a constraint surface for the feather. For a skin surface with polygonal mesh surfaces, for example, each of the vertices defining the feather locale is displaced in a direction normal to the skin surface. The amount of displacement at each of the vertices is determined by evaluating $C(x)$ at the vertex using equation (1), the scalar potential field $\Phi(x)$, and the loft function M. FIG. 9 illustrates the feather locale after deformation, referred to as the lofted skin 910. The intended feather location 920 is illustrated in FIG. 9 as being located at the center of the lofted skin 910.

At step 630 of FIG. 6, a sublamina mesh surface and the corresponding data structure, a sublamina mesh, are created. The sublamina mesh surface lies on the lofted skin and is sized such that its perimeter bounds the feather, taking into account the feather root position $x_r$, shape, and direction. In one exemplary embodiment, the sublamina mesh surface is a rectangular mesh aligned with the feather direction. A sublamina mesh is a data structure storing information of a sublamina mesh surface, which may include a rectangular subset of an implicit constraint surface of infinite size. In other words, the sublamina mesh is an explicit instantiation of the implicit constraint surface.

Figure 10A:
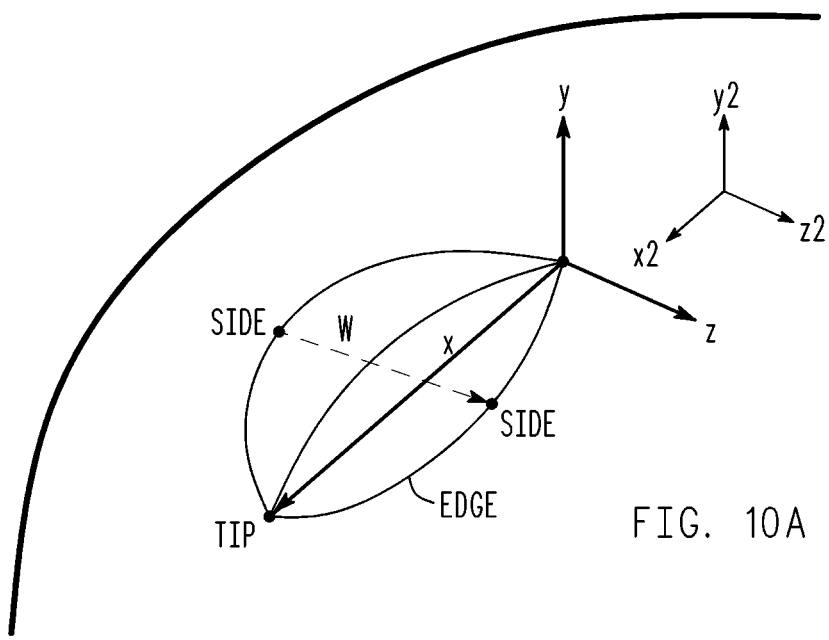
FIG. 10A illustrates a feather frame.

To create the sublamina mesh surface, a feather frame is first constructed as shown in FIG. 10A. The feather frame is a three-dimensional Cartesian coordinate system in which the origin O of the orthogonal coordinate axes (x, y, and z) is located at the feather root position. Also shown in FIG. 10A is the world frame with orthogonal coordinate axes ($x_2$, $y_2$, and $z_2$), the frame of reference in which the skin surface of the character is originally defined. The world frame generally may differ from the feather frame, but a point referenced with respective to the world frame may be referenced with respect to the feather frame, and vice versa, by a combination of linear transformations (for example, a translation of the point origin and a rotation of the coordinate axes). The x-axis of the feather frame is a vector from the feather root position to the tip of the feather. A preliminary z-axis (referred to as the z'-axis) is constructed to be parallel to a vector connecting the two endpoints of a span across the width of the feather (vector w in FIG. 10A). In one embodiment, the span is approximately the widest span. It should be recognized that since the feather may not be symmetrical with respect to the x-axis, the z'-axis may not be orthogonal to the x-axis. To construct a z-axis that is orthogonal to both the x-axis and the y-axis, the y-axis is constructed by taking a cross-product of the x-axis and the z'-axis, and then the z-axis is constructed by taking a cross-product of the x-axis and the y-axis.

Figure 10B:
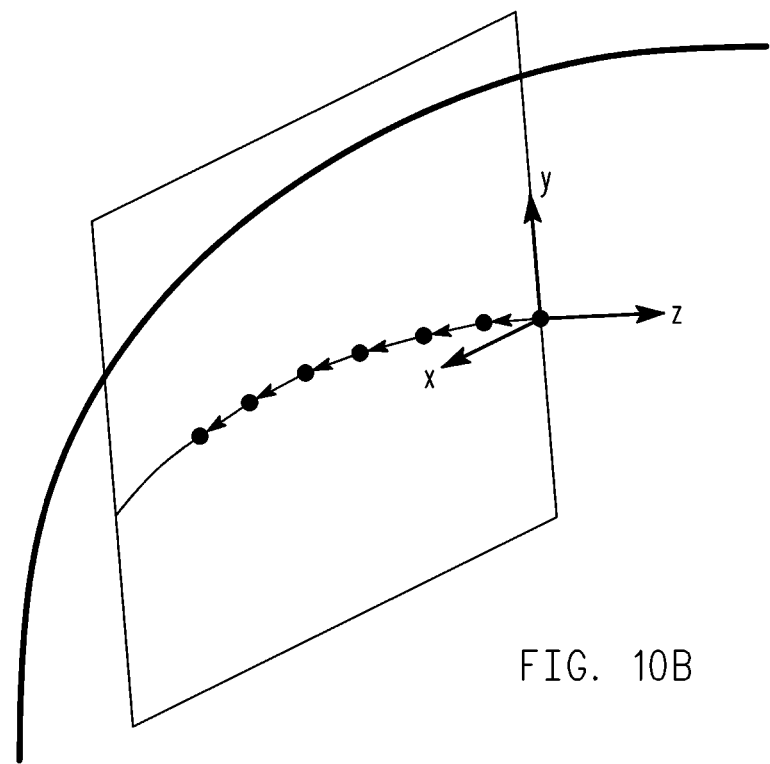
FIG. 10B illustrates a shaft plane.
Figure 10C:
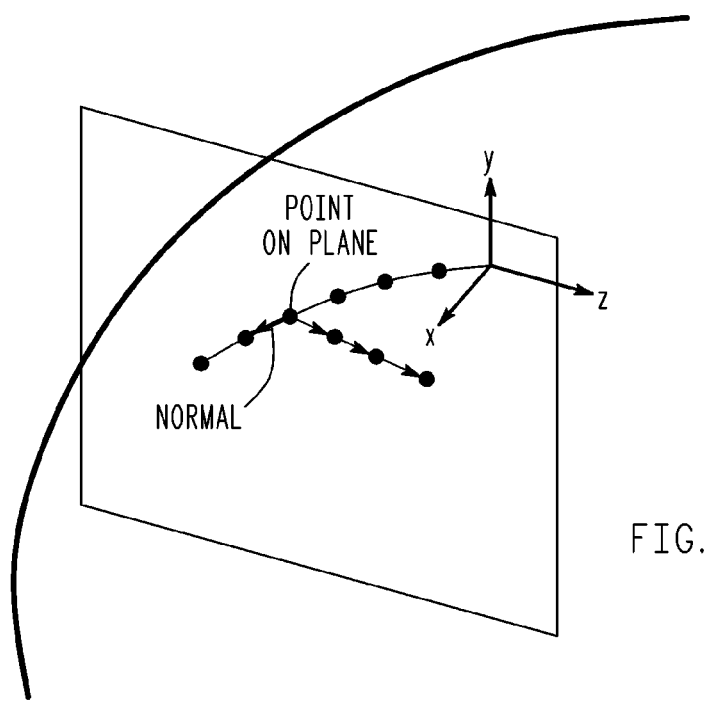
FIG. 10C illustrates a barb plane.

With the feather frame constructed, two types of cutting planes for constructing the sublamina mesh are constructed. The first type of cutting plane, shown in FIG. 10B, is referred to as the shaft plane because it is aligned with the feather's main shaft. FIG. 10C depicts the second type of cutting plane, perpendicular to the shaft plane and referred to as the barb plane.

Each of the cutting planes is an implicit plane defined by a point on the plane and a vector normal to the plane. There is a single shaft plane and multiple barb planes. The shaft plane may be defined by the origin O of the feather frame (as a point on the shaft plane) and the z-axis (as a vector normal to the shaft plane).

Similarly, the middle barb plane may be defined by the origin O of the feather frame a point on the middle barb plane) and the x-axis (as a vector normal to the middle barb plane). Each of the other barb planes may be defined by a point (x, 0, 0) and the x-axis, where x is non-zero. Alternatively, instead of using the x-axis as the normal of the barb planes, the current shaft intersection segment direction may be used as the normal, as shown in FIG. 10C.

Figure 10D:
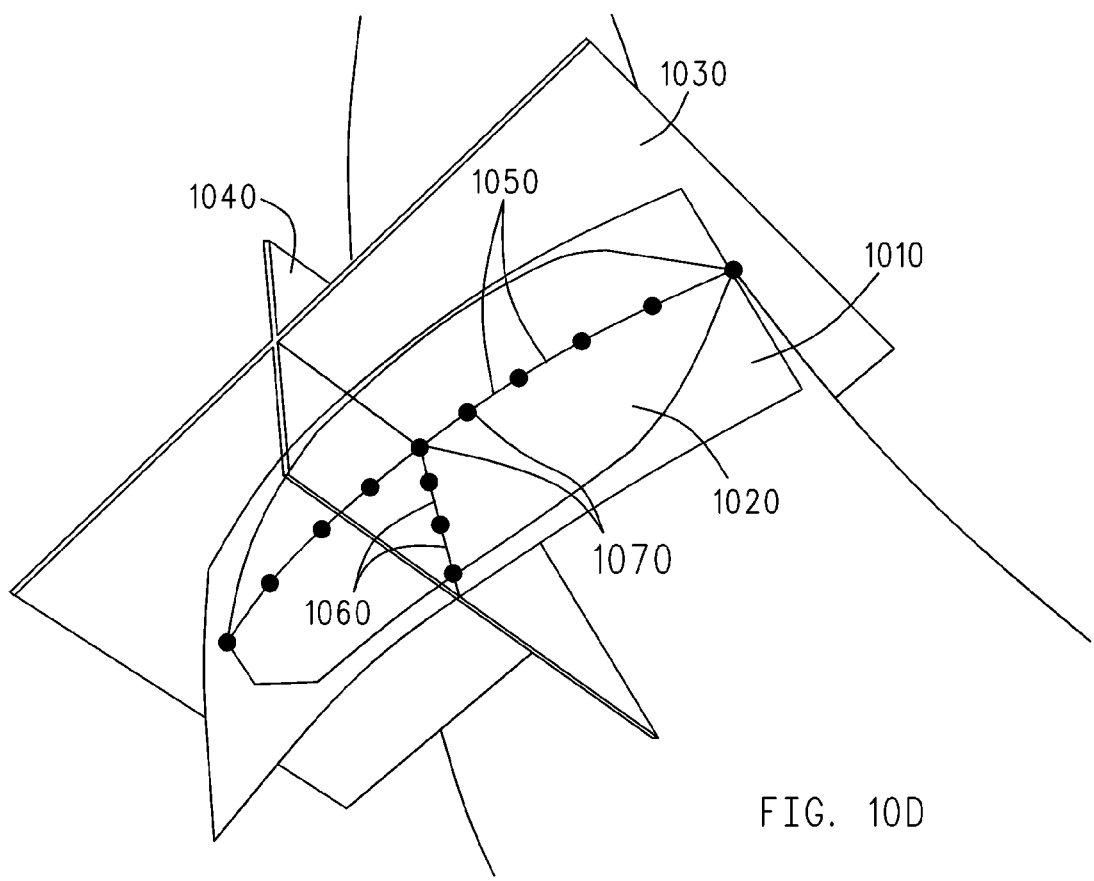
FIG. 10D illustrates a sublamina mesh surface constructed by intersecting the lofted skin with cutting planes parallel to the feather direction (shaft planes) and perpendicular to the feather direction (barb planes).
Figure 11:
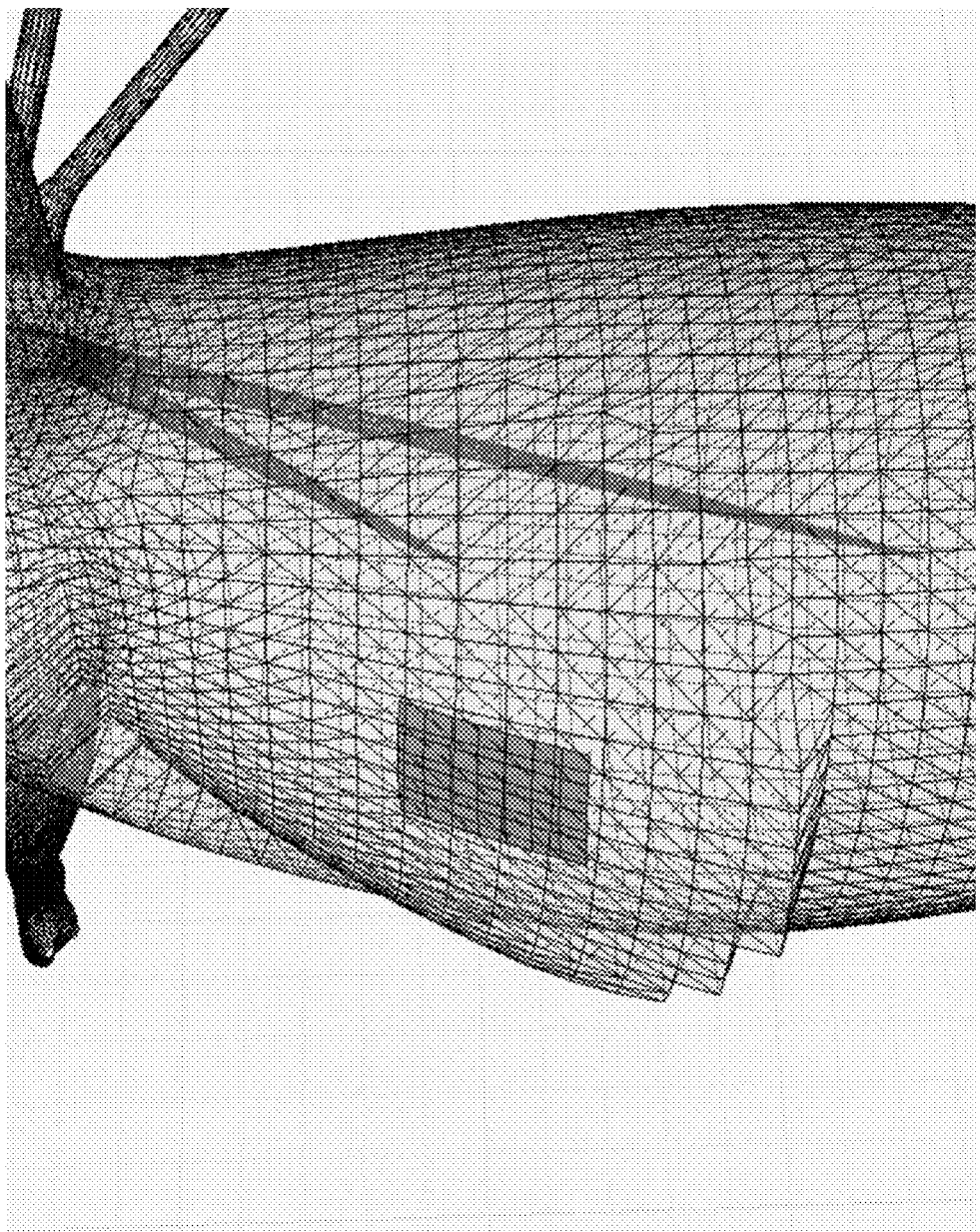
FIG. 11 illustrates a constructed sublamina mesh surface embedded in a lofted skin.
Figure 12:
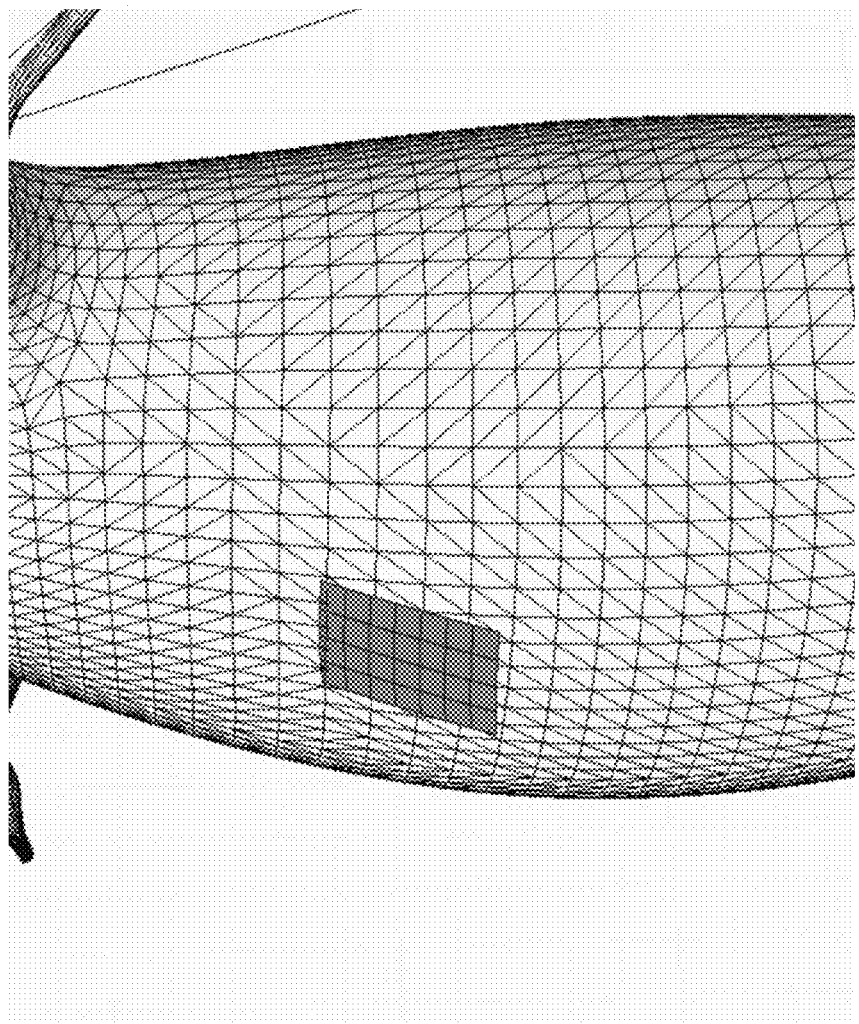
FIG. 12 illustrates a constructed sublamina mesh surface lying on top of the original skin surface shown in FIG. 7.
Figure 13A:
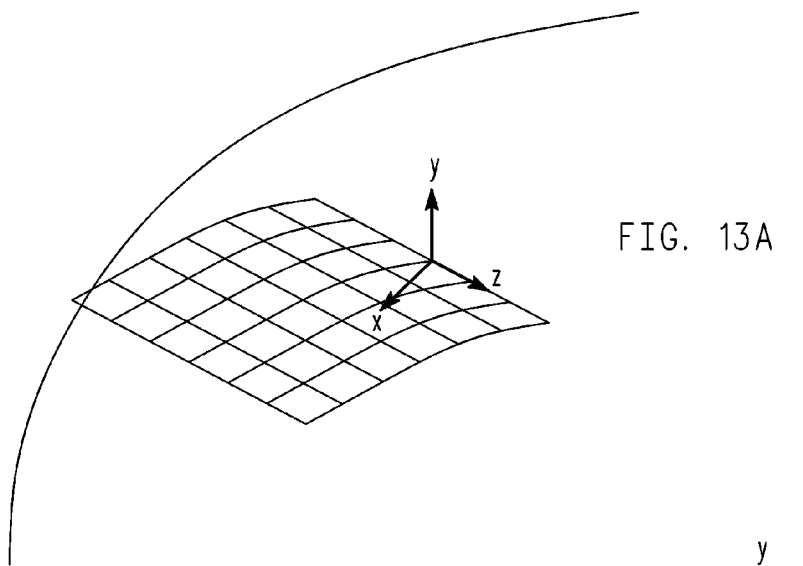
FIG. 13A illustrates a constructed sublamina mesh surface.

With the implicit cutting planes defined, the sublamina mesh surface 1010 is constructed by intersecting the lofted skin with the implicit cutting planes as shown in FIG. 10D. In one exemplary embodiment, the lofted skin is defined by polygonal mesh surfaces. Intersecting a shaft plane 1030 with a polygon creates an intersecting segment 1050, with a vertex at each end of the intersecting segment. A plurality of intersected polygons on the lofted skin result in a plurality of contiguous intersecting segments 1050 with corresponding vertices between the successive segments, as shown in FIG. 10D. At each vertex of the plurality of contiguous intersecting segments 1050, a barb plane 1040 that intersects with the vertex and with a plurality of polygons on the lofted skin is formed, resulting in a plurality of contiguous intersecting segments 1060 with corresponding vertices between successive segments. By performing the barb plane intersection step for each vertex of the plurality of contiguous intersecting segments 1050, the segments so formed (1050 and 1060) and/or the vertices of these segments may be used to define the sublamina mesh surface 1010. FIG. 13A shows a constructed sublamina mesh surface referenced with respect to the feather frame. FIG. 11 illustrates the constructed sublamina mesh surface embedded in the lofted skin. FIG. 12 illustrates the constructed sublamina mesh surface lying on top of the original skin surface.

The construction of the sublamina mesh surface has been described with the usage of a single shaft plane and multiple barb planes; however, one of ordinary skill in the art will recognize that the sublamina mesh surface may also be constructed using a single barb plane and multiple shaft planes, or by using multiple shaft planes and multiple barb planes.

It should be recognized that the intersection of the implicit cutting planes with the lofted skin may be performed by a commercial off-the-shelf intersection library routine. The library routine takes an implicit plane and a set of polygonal mesh surfaces as inputs and provides a plurality of contiguous intersecting segments as outputs. However, it should be recognized that other intersecting algorithms may be used as well.

Figure 13B:
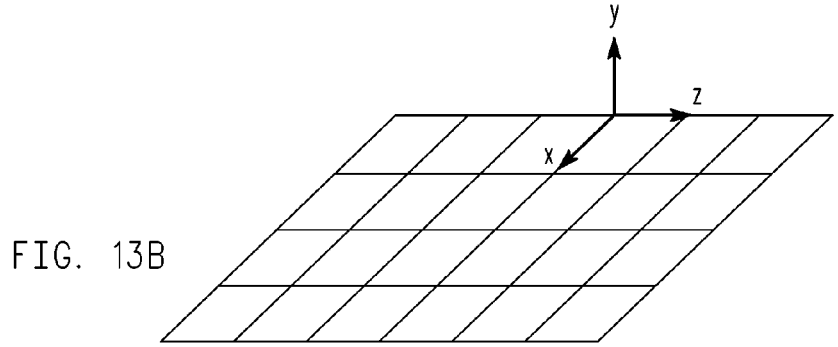
FIG. 13B illustrates a basis sublamina mesh surface.
Figure 13C:
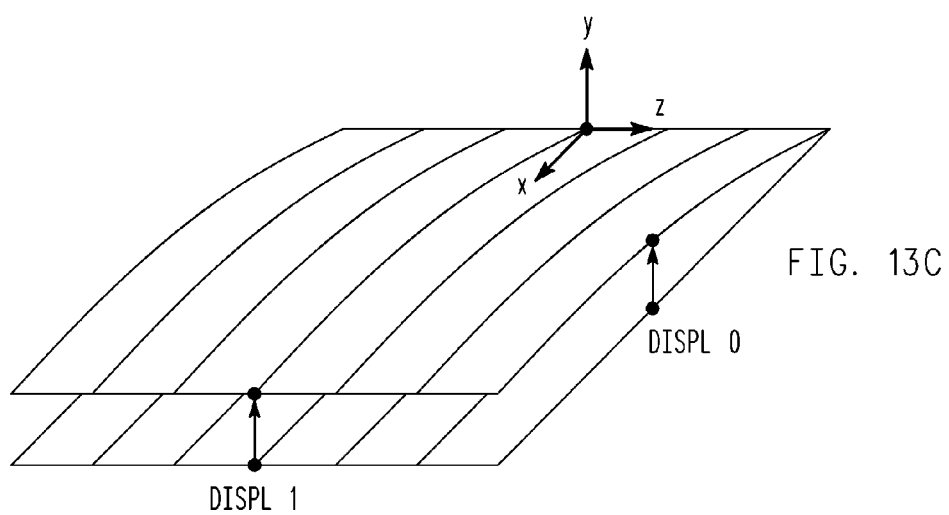
FIG. 13C illustrates that each vertex of the basis sublamina mesh surface is related to a corresponding counterpart vertex on the actual sublamina mesh surface by a vector displacement.
Figure 13E:
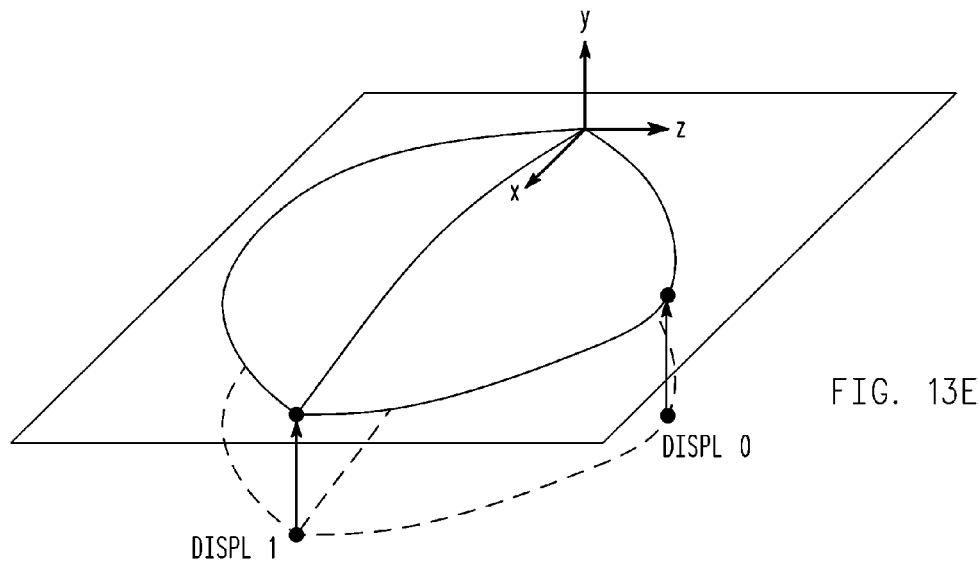
FIG. 13E illustrates the feather in FIG. 13D projected onto a sublamina mesh surface.
Figure 13D:
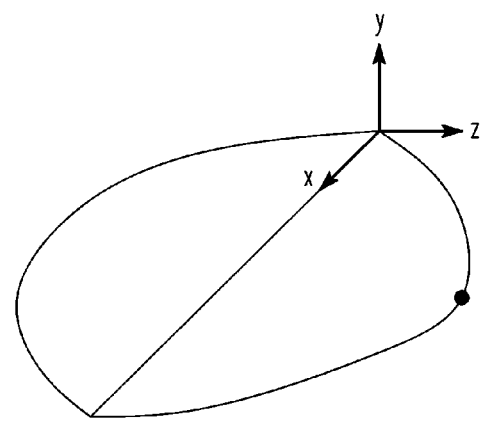
FIG. 13D illustrates a flat feather shape.
Figure 13F:
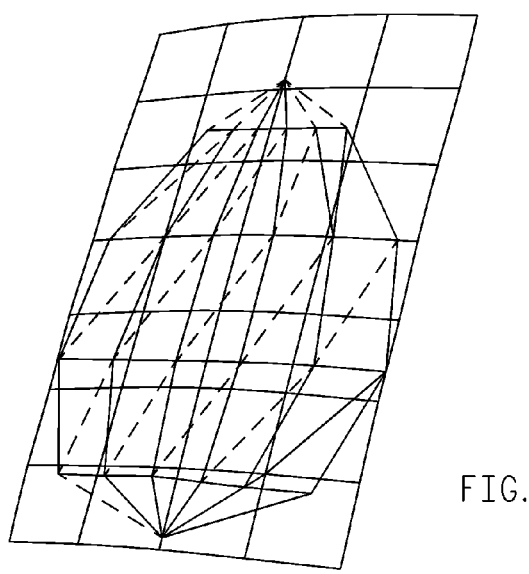
FIG. 13F illustrates another feather projected onto a sublamina mesh surface.

At step 640, the feather is projected onto the sublamina mesh surface as shown in FIG. 13F. As previously described, the feather shape is provided by the animation pipeline system and is represented as a flat surface (or if a curved surface, can be initially deformed into a flat surface). To perform the projection, a flat mesh surface referred to as the basis sublamina mesh surface, may be used. As shown in FIG. 13B, the basis sublamina mesh surface is referenced with respect to the feather frame, and consists of vertices laid out in the same manner as the corresponding actual sublamina mesh surface of FIG. 13A. Each vertex of the basis sublamina mesh surface is related to a corresponding counterpart vertex on the actual sublamina mesh surface by a vector displacement, as shown in FIG. 13C. The flat feather shape is first represented in terms of the flat basis sublamina mesh surface. Points along the boundary of the feather shape that do not coincide with a vertex of the basis sublamina mesh surface may be interpolated from the nearest vertices. Once the feather is represented in terms of the basis sublamina mesh surface, it may then be projected onto the actual sublamina mesh surface by applying the vector displacements as shown in FIG. 13C. Shown in FIG. 13D is the initial flat feather shape, and in FIG. 13E is the corresponding projected feather obtained by applying the vector displacements.

In one exemplary embodiment, a UV correspondence based approach (or texture space correspondence based approach) may be used for the projection. This approach is similar to that previously described, except that the projection makes use of the additional (u, v) texture coordinate information included with the feather shape and the sublamina mesh surface: the projection is accomplished by applying the vector displacement to a given vertex on the feather shape with the same texture coordinates as a point of the sublamina mesh surface. It should be recognized that other projection methods may be used as well.

At step 650, the lofted skin is reverted back to the skin surface by applying the inverse of the constraint surface displacement mapping. In particular, for each point on the lofted skin, the inverse mapping displaces the point by a distance equal to that of the constraint surface displacement mapping, but in the opposite direction. For example, the constraint surface displacement mapping may be stored in a data structure at step 620, and the inverse mapping may be determined therefrom. The displacement of the lofted skin from the skin surface at step 620 is reversed. Step 650 undoes the deformation of the skin surface in step 620, reverting the lofted skin back to its original state such that the next feather has a base skin to work from.

Lamination steps 610 to 650 may be done iteratively in a sequential manner for each feather. Alternatively, since there are no dependencies linking the construction of one feather with another, the lamination procedure may be done in parallel for multiple feathers. As a result, the time for generating the feathers for a primary animation character with thousands of feathers may be significantly reduced.

Figure 14:
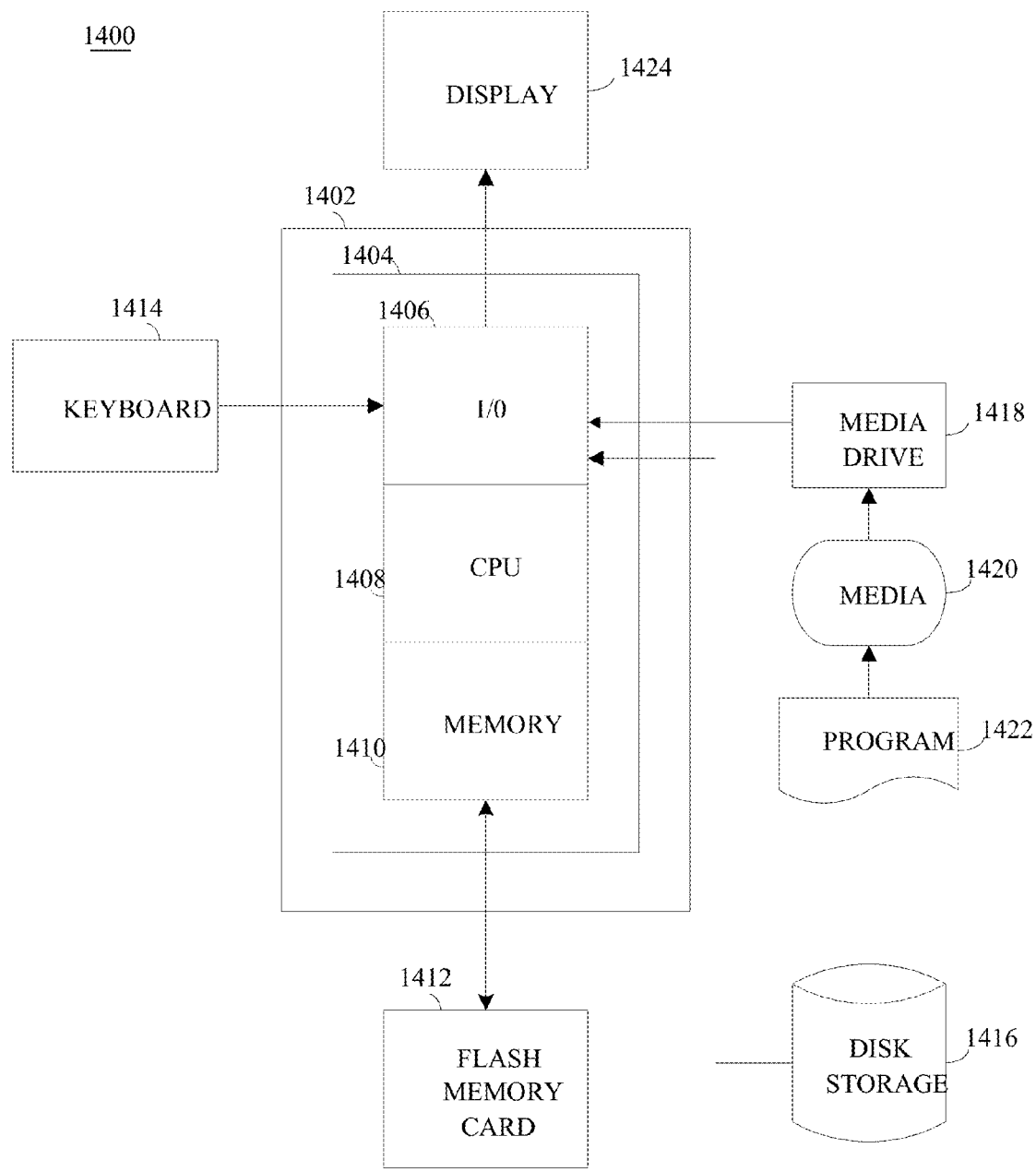
FIG. 14 illustrates an exemplary computing system.

FIG. 14 depicts an exemplary computing system 1400 configured to perform any one of the above-described processes. In this context, computing system 1400 may include, for example, a processor, memory, storage, and input/output devices (e.g., monitor, keyboard, disk drive, Internet connection, etc.). However, computing system 1400 may include circuitry or other specialized hardware for carrying out some or all aspects of the processes. In some operational settings, computing system 1400 may be configured as a system that includes one or more units, each of which is configured to carry out some aspects of the processes either in software, hardware, or some combination thereof.

FIG. 14 depicts an exemplary computing system 1400 with a number of components that may be used to perform the above-described processes. The main system 1402 includes a motherboard 1404 having an input/output ("I/O") section 1406, one or more central processing units ("CPU") 1408, and a memory section 1410, which may have a flash memory card 1412 related to it. The I/O section 1406 is connected to a display 1424, a keyboard 1414, a disk storage unit 1416, and a media drive unit 1418. The media drive unit 1418 can read/write a computer-readable medium 1420, which can contain programs 1422 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-enabled method of generating a skin-attached element on a skin surface of an animated character, the method comprising:
    deforming a region of the skin surface within a predetermined distance from a skin-attached element root position to form a lofted skin according to one of a plurality of constraint surfaces, wherein each of the plurality of constraint surfaces does not intersect with each other, and wherein each of the plurality of constraint surfaces comprises a displacement from the skin surface of the animated character;
    creating a sublamina mesh surface constrained to the lofted skin;
    projecting a two-dimensional version of the skin-attached element onto the sublamina mesh surface; and
    reverting the lofted skin back to a state of the skin surface prior to the deformation of the region of the skin surface by applying an inverse of the displacement of the lofted skin from the skin surface.

2. The method of claim 1, wherein deforming the region of the skin surface comprises:
    determining the region of the skin surface, wherein the predetermined distance comprises a first predetermined distance and a second predetermined distance, and wherein the region is within the first predetermined distance from the skin-attached element root position along the skin-attached element direction and within the second predetermined distance from the skin-attached element root position along a direction perpendicular to the skin-attached element direction.

3. The method of claim 2, wherein the first predetermined distance is based on the length of the skin-attached element, and wherein the second predetermined distance is based on the width of the skin-attached element.

4. The method of claim 2, wherein determining the region of the skin surface comprises:
    determining a plurality of vertices, the plurality of vertices within the first predetermined distance from the skin-attached element root position along the skin-attached element direction and within the second predetermined distance from the skin-attached element root position along the direction perpendicular to the skin-attached element direction, and wherein the plurality of vertices comprises vertices of polygonal mesh surfaces defining the skin surface.

5. The method of claim 1, wherein the lofted skin is displaced from the skin surface in a direction normal to the skin surface, and wherein the displacement of the lofted skin from the skin surface is based on a scalar potential field and a loft function defining the one of the plurality of constraint surfaces, and wherein the loft function is related to the curvature of the skin-attached element.

6. The method of claim 5, wherein the loft function is a monotonically increasing function.

7. The method of claim 5, wherein the loft function is a linear function.

8. The method of claim 1, wherein the sublamina mesh surface comprises a data structure storing information of a rectangular subset of the one of the plurality of constraint surfaces.

9. The method of claim 1, wherein the sublamina mesh surface comprises a rectangular mesh lying on the lofted skin and aligned with the skin-attached element direction, the rectangular mesh binds the skin-attached element.

10. The method of claim 1, wherein creating a sublamina mesh surface comprises:
    constructing a frame for the skin-attached element, wherein the frame for the skin-attached element is a three-dimensional Cartesian coordinate system in which the origin is located at the skin-attached element root position, and wherein the frame comprises a first axis, a second axis, and a third axis, the first axis being aligned with a vector connecting the skin-attached element root position to the tip of the skin-attached element.

11. The method of claim 10, wherein constructing the frame for the skin-attached element comprises:
    constructing a preliminary axis, wherein the preliminary axis is parallel to a vector connecting two endpoints of a span across the width of the skin-attached element.

12. The method of claim 11, further comprising:
    constructing the second axis by taking a cross-product of the first axis and the preliminary axis; and
    constructing the third axis by taking a cross-product of the first axis and the second axis.

13. The method of claim 12, wherein creating the sublamina mesh surface comprises:
    constructing a shaft plane, wherein the shaft plane is defined by the origin of the frame for the skin-attached element and a vector normal to the shaft plane, wherein the vector normal to the shaft plane is aligned with the third axis.

14. The method of claim 13, wherein creating the sublamina mesh surface comprises
constructing a first barb plane, wherein the first barb plane is defined by the origin of the frame for the skin-attached element and a vector normal to the first barb plane, and wherein the vector normal to the first barb plane is aligned with the first axis.

15. The method of claim 14, wherein creating the sublamina mesh surface comprises:
constructing a second barb plane, wherein the second barb plane is defined by a point on the first axis and a vector normal to the second barb plane, and wherein the vector normal to the second barb plane is aligned with the first axis.

16. The method of claim 15, wherein creating the sublamina mesh surface comprises:
intersecting the shaft plane, the first barb plane, and the second barb plane with the lofted skin at a plurality of intersection points; and
defining the sublamina mesh surface using the intersection points.

17. The method of claim 1, wherein creating the sublamina mesh surface comprises:
intersecting a shaft plane and a plurality of barb planes with the lofted skin at a plurality of intersection points; and
defining the sublamina mesh surface using the intersection points, wherein the shaft plane is a plane parallel to the skin-attached element direction, and wherein the plurality of barb planes are planes perpendicular to the skin-attached element direction.

18. The method of claim 1, wherein projecting the two-dimensional version of the skin-attached element onto the sublamina mesh surface comprises:
constructing a flat basis sublamina mesh surface, the flat basis sublamina mesh surface including a plurality of vertices, wherein the plurality of vertices are related to a corresponding plurality of vertices on the sublamina mesh surface by a plurality of vector displacements.

19. The method of claim 18, wherein projecting the two-dimensional version of the skin-attached element further comprises:
representing the two-dimensional version of the skin-attached element with the flat basis sublamina mesh surface; and
projecting the represented two-dimensional version of the skin-attached element onto the sublamina mesh surface using the plurality of vector displacements.

20. The method of claim 1, wherein reverting the lofted skin back to the state of the skin surface prior to the deformation of the region of the skin surface comprises:
reversing displacement of the lofted skin from the skin surface.

21. A computer system for generating a skin-attached element on a skin surface of an animated character, the system comprising:
memory configured to store the skin-attached element; and
one or more processors configured to:
deform a region of the skin surface within a predetermined distance from a skin-attached element root position to form a lofted skin according to one of a plurality of constraint surfaces, wherein each of the plurality of constraint surfaces does not intersect with each other, and wherein each of the plurality of constraint surfaces comprises a displacement from the skin surface of the animated character;
create a sublamina mesh surface constrained to the lofted skin;
project a two-dimensional version of the skin-attached element onto the sublamina mesh surface; and
revert the lofted skin back to a state of the skin surface prior to the deformation of the region of the skin surface by applying an inverse of the displacement of the lofted skin from the skin surface.

22. A non-transitory computer-readable storage medium comprising computer-executable instructions for generating a skin-attached element on a skin surface of an animated character, the computer-executable instructions comprising instructions for:
deforming a region of the skin surface within a predetermined distance from a skin-attached element root position to form a lofted skin according to one of a plurality of constraint surfaces, wherein each of the plurality of constraint surfaces does not intersect with each other, and wherein each of the plurality of constraint surfaces comprises a displacement from the skin surface of the animated character;
creating a sublamina mesh surface constrained to the lofted skin;
projecting a two-dimensional version of the skin-attached element onto the sublamina mesh surface; and
reverting the lofted skin back to a state of the skin surface prior to the deformation of the region of the skin surface by applying an inverse of the displacement of the lofted skin from the skin surface.

* * * * *

UNITED STATES PATENT AND TRADEMARK OFFICE
CERTIFICATE OF CORRECTION

| | | |
|---|---|---|
| PATENT NO. | : 8,982,157 B2 | Page 1 of 1 |
| APPLICATION NO. | : 12/844822 | |
| DATED | : March 17, 2015 | |
| INVENTOR(S) | : Andrew J. Weber et al. | |

It is certified that error appears in the above-identified patent and that said Letters Patent is hereby corrected as shown below:

On the Title Page:

On the second page, item 56 under OTHER PUBLICATIONS, in column 2, line number 11, delete "Cinefx," and insert -- Cinefex, --, therefor.

In the Specification:

In column 3, line number 38, delete "well" and insert -- well. --, therefor.

In column 4, line number 38, delete "a" and insert -- $\alpha$ --, therefor.

In column 5, line number 5 (Equation), delete "$\Phi(x_2)$." and insert -- $\Phi(x_{r2})$. --, therefor.

In column 5, line number 11 (Equation), delete "$(x_{r2}))$." and insert -- $\Phi(x_{r2}))$. --, therefor.

In column 7, line number 32, before "a" insert -- (as --.

Signed and Sealed this
Seventeenth Day of May, 2016

Michelle K. Lee
*Director of the United States Patent and Trademark Office*